No. 792,541. Patented June 13, 1905.

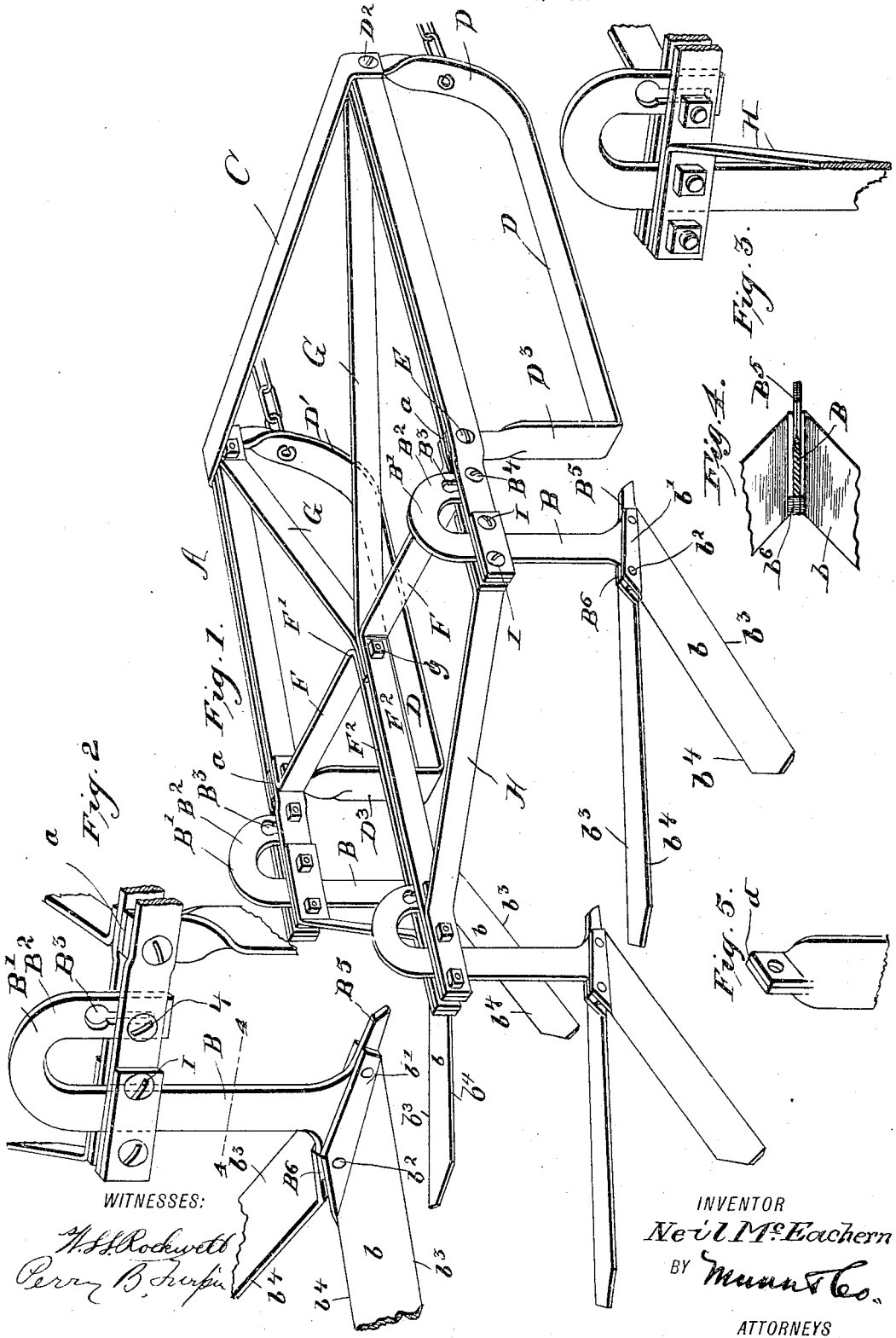

UNITED STATES PATENT OFFICE.

NEIL McEACHERN, OF WALLA WALLA, WASHINGTON, ASSIGNOR TO ADAM W. SEVERANCE AND MILFORD H. BROUGHTON, OF WALLA WALLA, WASHINGTON.

WEEDER.

SPECIFICATION forming part of Letters Patent No. 792,541, dated June 13, 1905.

Application filed March 7, 1905. Serial No. 248,861.

*To all whom it may concern:*

Be it known that I, NEIL MCEACHERN, a citizen of the United States, residing at Walla Walla, in the county of Wallawalla and State of Washington, have made certain new and useful Improvements in Weeders, of which the following is a specification.

My invention is an improvement in weeders; and it consists in certain novel constructions and combinations of parts, as will be hereinafter described and claimed.

In the drawings, Figure 1 is a perspective view of a weeder embodying my invention. Fig. 2 is a detail perspective view, partly broken away, showing one of the side cutters and the means for holding the same in position. Fig. 3 is a detail perspective view showing the rear cutters and the means for holding the same in position. Fig. 4 is a detail cross-section on about line 4 4 of Fig. 2, and Fig. 5 is a detail perspective view showing the rear standard of one of the runners.

The main frame includes the side bars A, which are arranged in pairs and constitute keeper-bars between which are secured the main and returned portions of the uprights B of the side cutters. The frame is braced at its front end by a cross-bar C and is supported at such end upon runners D, whose upturned front portions D' are bolted at $D^2$ to the keeper-bars A and whose rear standards $D^3$ are slitted centrally in their upper ends, forming the side sections $d$, which are pressed side by side and fitted between the keeper-bars A and are secured to the outer ends of the cross-bars F, which latter are bent at F', midway between the side beams of the frame, and have the rearwardly-extending wings $F^2$, which form the keeper-bars, between which is secured the upright of the rear cutter, as shown in Fig. 1 of the drawings.

Diagonal braces G extend between the front ends of the side beams A and the inner ends of the side bars F and are secured by the bolt $g$, as shown. I also provide strut-braces H, extending between the rear ends of the keeper-bars $F^2$ and the rear ends of the side beams A and secured to the latter by the bolts I I, which operate to secure the cutter between the keeper-bars, as shown in Fig. 1.

The side cutters and the rear cutter are alike and are similarly secured or held in place, so that the description of one of the side cutters will answer for all. As shown, the cutters include the uprights B and the blades $b$. The uprights B extend between the keeper-bars A, and the bolts I connect said keeper-bars in front and rear of the main portion of the upright B, and above the said keeper-bars the upright B is returned at B' and has a downwardly-extending portion $B^2$ in front of its main portion and slotted at $B^3$ for the passage of the bolt $B^4$, which extends through the said slot and also through the keeper-bars $a$ and operates to securely hold the return portion of the upright in place between the keeper-bars. Thus the returned portion reinforces and embraces the main portion of the upright, and by slacking the bolts I and $B^4$ the cutters may be adjusted up or down to any desired extent. These uprights are provided at their lower ends with feet having forwardly-projecting portions $B^5$ and rearwardly-projecting portions or heels $B^6$, and the said uprights B may preferably be sharpened on their front edges.

The blades $b$ are provided at their front ends with upturned flanges $b'$, which are riveted or otherwise secured at $b^2$ to the front and heel portions at the lower ends of the uprights B, and these blades $b$ extend rearwardly and outwardly from their respective uprights B and are arranged at an incline to the horizontal, sloping upwardly from their front or cutting edges $b^3$ to their rear or upper edges $b^4$, as will be understood from Fig. 1 of the drawings.

It will be noticed that the upright B is in front of the knives or blades $b$, so that it will pass through the bushy tops of weeds before they are cut off under the surface of the ground by the blades operating in rear of the said uprights, thus avoiding any clogging of the uprights. It will also be noticed that the uprights are secured adjustably by means of the three bolts I I $B^4$, arranged and operated as before described, whereby the upright may be adjusted to vary the pitch and depth of the blades to suit the ground being cultivated, as will be understood by those skilled in the art.

Having thus described my invention, what I claim as new, and desire to secure by Letters Patent, is—

1. The improved weeder herein described, comprising the main frame having side beams consisting of keeper-bars, spaced apart to receive between them the uprights of the cutters, the runners supporting said beams, and the bars extending between and bracing the beams apart, the rear cross-bar having rearwardly-projecting wings forming keeper-bars for the rear cutter, and diagonal braces between the rear ends of the intermediate keeper-bars and the rear ends of the side keeper-bars, and the cutters having uprights comprising main portions provided at their lower ends with feet and having their upper ends returned, providing the depending and reinforcing and slotted portion in advance of the main portion of the upright, the main portion and returned portion of said upright fitting between its respective keeper-bars, bolts connecting the keeper-bars in front and rear of the main portion of the upright, a bolt connecting the keeper-bars and extending through a slot in the returned portion of the upright, and the blades provided at their ends with upturned flanges secured to the foot portions of the uprights and extending thence rearwardly and outwardly from the uprights, and inclining upwardly from their front and rear edges, all substantially as and for the purposes set forth.

2. In a weeder, the combination with the frame, having keeper-bars spaced apart to receive the cutter-uprights between them, the cutter having an upright formed with a returned and depending portion, said upright and its returned portion fitting between the keeper-bars of the frame, the blades at the lower ends of the uprights, the bolts connecting the keeper-bars in front and rear of the main portion of the upright, and the bolt connecting the keeper-bars and extending through the returned portion of the upright, substantially as set forth.

NEIL McEACHERN.

Witnesses:
   THOS. PREISKER,
   S. B. MILLER.